United States Patent
Koshino et al.

(10) Patent No.: US 7,317,923 B2
(45) Date of Patent: Jan. 8, 2008

(54) RADIO ACCESS NETWORK SYSTEM, RADIO COMMUNICATION METHOD, CONTROL SERVER AND DATA SERVER

(75) Inventors: Masayuki Koshino, Fujisawa (JP); Mayu Yamada, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 126 days.

(21) Appl. No.: 10/724,088

(22) Filed: Dec. 1, 2003

(65) Prior Publication Data

US 2004/0162079 A1  Aug. 19, 2004

(30) Foreign Application Priority Data

Dec. 2, 2002  (JP) .............................. 2002-349865

(51) Int. Cl.
*H04Q 7/20*  (2006.01)
(52) U.S. Cl. .................... 455/455; 455/422.1; 455/560; 455/403; 455/423; 370/216; 370/328; 370/338
(58) Field of Classification Search ................ 455/445, 455/422.1, 560, 403, 423; 370/216, 328, 370/338
See application file for complete search history.

(56) References Cited

U.S. PATENT DOCUMENTS

| | | | |
|---|---|---|---|
| 2002/0012328 A1* | 1/2002 | Emanuel et al. | 370/328 |
| 2002/0035699 A1* | 3/2002 | Crosbie | 713/201 |
| 2002/0082015 A1* | 6/2002 | Wu | 455/436 |
| 2003/0185190 A1* | 10/2003 | Chitrapu et al. | 370/338 |

FOREIGN PATENT DOCUMENTS

| | | |
|---|---|---|
| CN | 1463128 | 12/2003 |
| EP | 1150521 A1 * | 10/2001 |
| EP | 1 367 841 | 12/2003 |
| EP | 1 377 089 | 1/2004 |
| JP | 2003-348661 | 12/2003 |
| JP | 2004-32333 | 1/2004 |

(Continued)

OTHER PUBLICATIONS

Stefano Micocci (IST-2001-34091 Scout) dicloses Requirement on netowrk and security architecture and traffic management schemes for dowload traffic based on IP principles in cellular and ad-hoc networks, Oct. 31, 2002.*

(Continued)

*Primary Examiner*—Rafael Perez-Gutierrez
*Assistant Examiner*—Khai Nguyen
(74) *Attorney, Agent, or Firm*—Oblon, Spivak, McClelland, Maier & Neustadt, P.C.

(57) ABSTRACT

The object of the present invention is to provide a radio access network system for properly distributing loads and functions of the control plane function and a user plane function of a control apparatus, thus enabling the addition of only a necessary function when a radio access network is expanded. The radio access network system comprises a control server 1 configured to manage a configuration of a radio access network including a base station 3, and to set a transfer path for a packet in accordance with the configuration, and a data server 2 configured to manage a resource of a base station 3 located in the transfer path set by the control server 1.

6 Claims, 10 Drawing Sheets

FOREIGN PATENT DOCUMENTS

JP          2004-48209          2/2004

OTHER PUBLICATIONS

S. Micocci, et al., IST-2001-34091 Scout D4.1.1, XP-002270821, pp. 1-32 and 113-118, "Requirements on Network and Security Architecture and Traffic Management Schemes for Download Traffic Based on IP Principles in Cellular and AD HOC Networks", Oct. 31, 2002.

M. Schopp, et al., Radio Network Concepts Information and Communication Mobile Siemens AG, XP-002270822, pp. 1-16, "Architekturen Für IP-Basierte Funkzugangsnetze", Jan. 25-26, 2001.

NEC, 3GPP TSG-RAN3 Meeting # 38, Tdoc: R3-031298, XP-002270823, pp. 1-6, "UE / Cell Split Utran Evolved Architecture", Oct. 6-10, 2003.

Siemens, 3GPP-TSG-RAN WG3 Meeting # 36, Tdoc R3-030678, XP-002270824, pp. 1-3, "Proposed Architecture for Utran Evolution", May 19-23, 2003.

* cited by examiner

FIG.8

| IP ADDRESS | UDP PORT NUMBER | TEID | CONNECTION ID |
|---|---|---|---|
| ... | ... | ... | ... |
| ... | ... | ... | ... |

| CONNECTION ID | NODE-B-SIDE TRANSMISSION/RECEPTION PORT INFORMATION | | SGSN-SIDE TRANSMISSION/RECEPTION PORT INFORMATION | | |
|---|---|---|---|---|---|
| | IP ADDRESS | UDP PORT NUMBER | IP ADDRESS | UDP PORT NUMBER | TEID |
| ... | ... | ... | ... | ... | ... |
| ... | ... | ... | ... | ... | ... |

| CONNECTION ID | GTP PROTOCOL INFORMATION | RLC PROTOCOL INFORMATION | MAC PROTOCOL INFORMATION |
|---|---|---|---|
| ... | ... | ... | ... |
| ... | ... | ... | ... |

T5

RADIO ACCESS NETWORK SYSTEM, RADIO COMMUNICATION METHOD, CONTROL SERVER AND DATA SERVER

CROSS REFERENCE TO RELATED APPLICATION

This application is based upon and claims the benefit of priority from the prior Japanese Patent Application No. P2002-349865, filed on Dec. 2, 2002; the entire contents of which are incorporated herein by reference.

BACKGROUND OF THE INVENTION

1. Field of the Invention

The present invention relates to a radio access network system which divides functions of a control apparatus (a radio network controller) in a radio access network, so as to properly distribute loads and functions of the control apparatus, a radio communication method, a control server and a data server.

2. Description of the Related Art

In a conventional 3rd Generation Partnership Project (3GPP) specification, a control apparatus has both a user plane function of transferring user data and a control plane function of executing control in a radio access network.

The control plane function manages a configuration of a radio access network including a base station etc., and executes communication control such as signaling. The user plane function manages resources such as a port used on a transfer path during packet transmission/reception.

As shown in FIG. 1A, the control apparatus is located between a core network and a mobile station in a radio access network, according to the conventional 3GPP specification. As shown in FIG. 1B, the control apparatus executes the control plane function so as to set the transfer path for a packet, and executes the user plane function so as to carry out protocol conversion or packet transfer in accordance with a transmission path set by the control plane function.

However, in the conventional 3GPP specification, the control plane function and the user place function are located in the same control apparatus as described above, so that a load of processing performed by the control plane function and a load of processing performed by the user plane function in the radio access network are concentrated in the same control apparatus. As a result, for example, the processing performed by the control plane function or the processing performed by the user plane function can be delayed.

Moreover, when the radio access network is expanded, even if it is desired to reinforce only the user plane function, reinforcement must be made including the control plane function which needs no reinforcement. As a result, the expansion of the radio access network incurs unnecessary cost.

BRIEF SUMMARY OF THE INVENTION

In view of the foregoing, it is an object of the present invention to provide a radio access network system for properly distributing loads and functions of the control plane function and a user plane function of a control apparatus and for enabling the addition of only a necessary function when a radio access network is expanded; and to provide a radio communication method, a control server and a data server corresponding to the same.

A first aspect of the present invention is summarized as a radio access network system including a control server and a data server. The control server is configured to manage a configuration of a radio access network including a base station, and to set a transfer path for a packet in accordance with the configuration. The data server is configured to manage a resource of a base station located in the transfer path set by the control server.

A second aspect of the present invention is summarized as a radio communication method in a radio access network including a base station, a control server and a data server. The method comprises the steps of: (A) managing a configuration of the radio access network in the control server; (B) setting a transfer path for a packet in accordance with the configuration, in the control server; and (C) managing a resource of a base station located in the transfer path set by the control server, in the data server.

A third aspect of the present invention is summarized as a control server comprising a manager configured to manage a configuration of a radio access network including a data server connected to the control server and a base station managed by the data server; a transfer path setter configured to set a transfer path for a packet in accordance with the configuration; a network configuration notifier configured to notify an instruction to reserve a resource of a base station in accordance with the configuration, when the transfer path is set.

In the third aspect, the control server can be connected to a plurality of data servers.

A fourth aspect of the present invention is summarized as a data server comprising: a manager configured to manage a resource of a base station located in a radio access network; a resource assigner configured to assign the resource to a transfer path for a packet in accordance with a resource reservation instruction notified by a control server; and a resource notifier configured to notify the assigned resource to the control server.

In the fourth aspect, the data server can transmit and receive the packet via the transfer path set by the control server.

BRIEF DESCRIPTION OF THE SEVERAL VIEWS OF THE DRAWINGS

FIG. 8 is an explanatory view illustrating a data structure of a destination port information table of the embodiment.

FIG. 9 is an explanatory view illustrating a data structure of a protocol information table of the embodiment.

FIG. 10 is an explanatory view illustrating a data structure of a resource reservation response message of the embodiment.

DETAILED DESCRIPTION OF THE INVENTION (Configuration of Radio Access Network System)

Referring to FIGS. 2 to 10, a radio access network system according to an embodiment of the present invention will be described in detail.

Figure 1A:
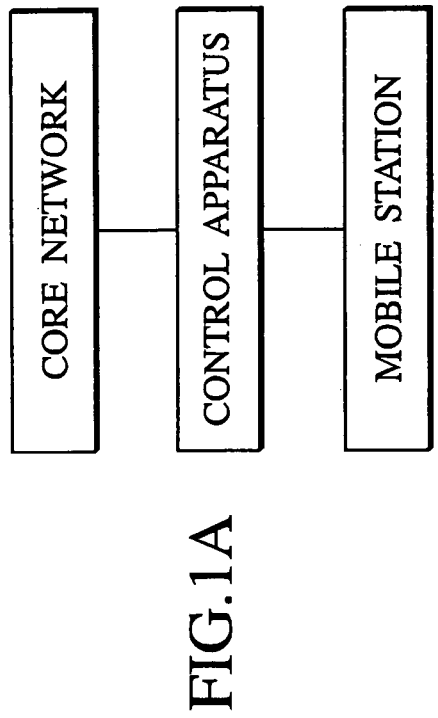
FIGS. 1A and 1B are explanatory views illustrating a schematic configuration of a conventional radio access network system.
Figure 1B:
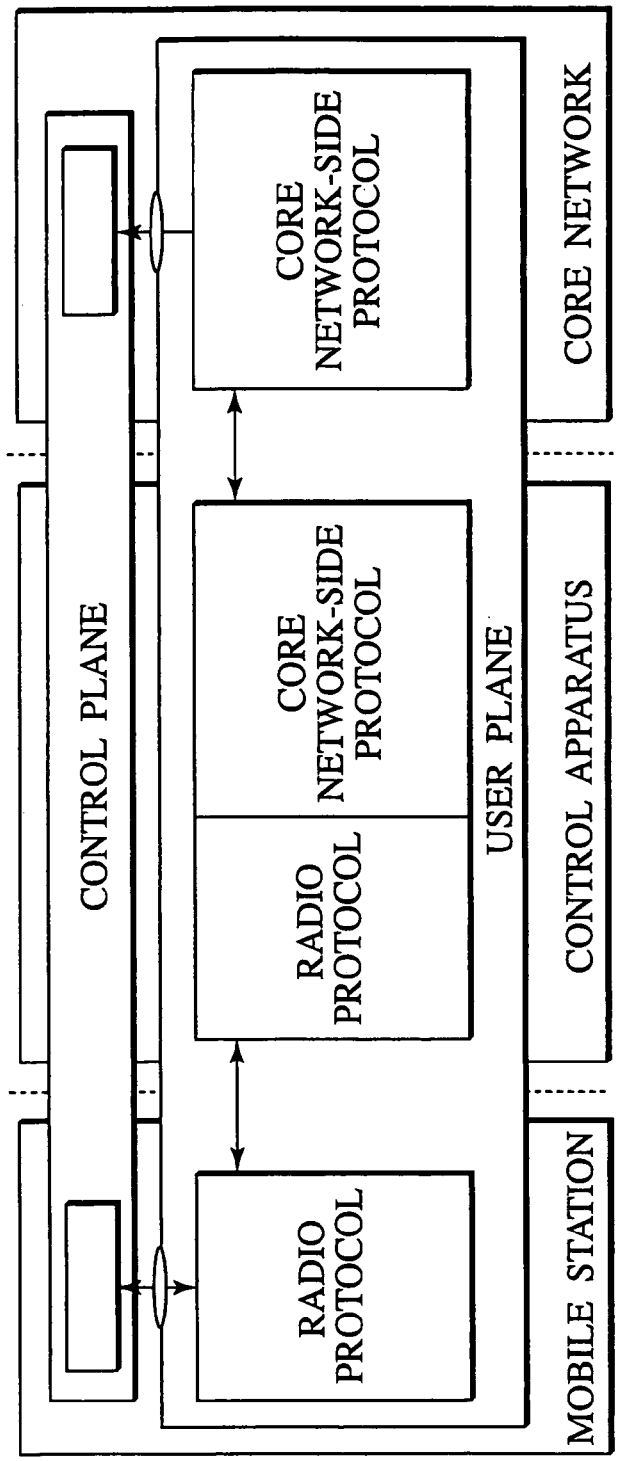
Figure 2:
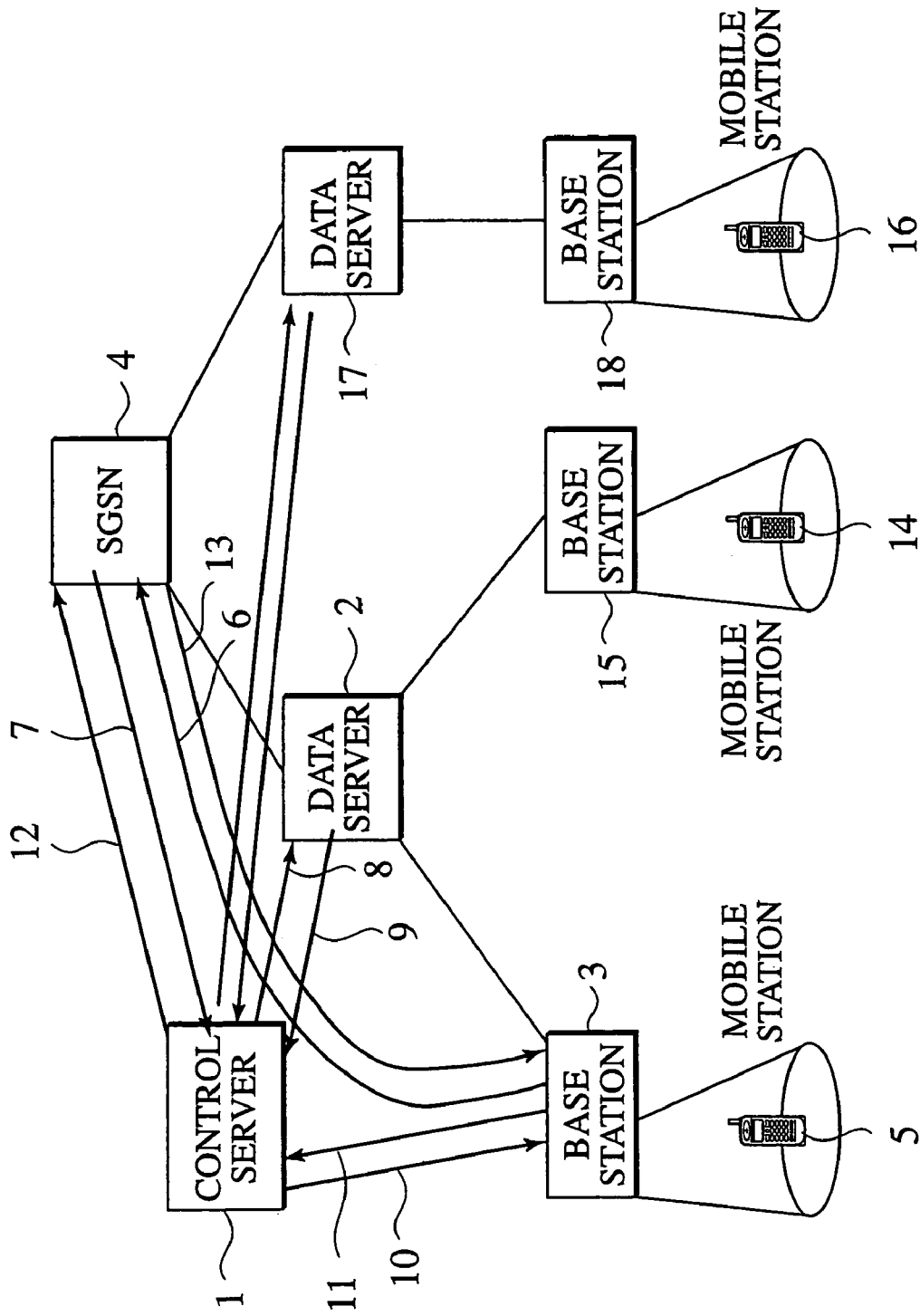
FIG. 2 is an explanatory view illustrating a schematic configuration of a radio access network system of an embodiment.

FIG. 2 is an explanatory view illustrating an entire configuration and a data flow of the radio access network system of the embodiment.

As shown in FIG. 2, the radio access network system of the embodiment roughly includes a control server 1, a plurality of data servers 2 and 17, a plurality of base stations (Node-B) 3, 15 and 18, a serving GPRS support node (SGSN) 4, and a plurality of mobile stations. The base stations 3, 15 and 18 are configured to manage an area (a cell) in which mobile stations 5, 14 and 16 respectively are present. The SGSN 4 is configured to control connection to a core network.

The base stations (Node-B) 3, 15 and 18 are configured to transmit/receive IP packets to/from the mobile stations 5, 14 and 16 existing in cells under their control. In this embodiment, the base stations 3, 15 and 18 are connected to a UDP/IP port of an RAN-side communicating unit 35 of the control server 1.

The SGSN 4 is configured to control setting of a transfer path for IP packets in the core network in response to a request from the mobile station 5. The SGSN 4 instructs the radio access network side to set an RAB (a radio access bearer), which is a transfer path on a base station or a control station located between the SGSN 4 and the mobile station 5 to be linked to the set transfer path.

The control server 1 is configured to manage a configuration of the radio access network and to set the transfer path for IP packets in accordance with the configuration.

The control server 1 controls signaling during IP packet transmission/reception, and executes a signaling function of the control plane function.

In the embodiment, the control server 1 is connected to a plurality of data servers 2 and 17.

Figure 3:
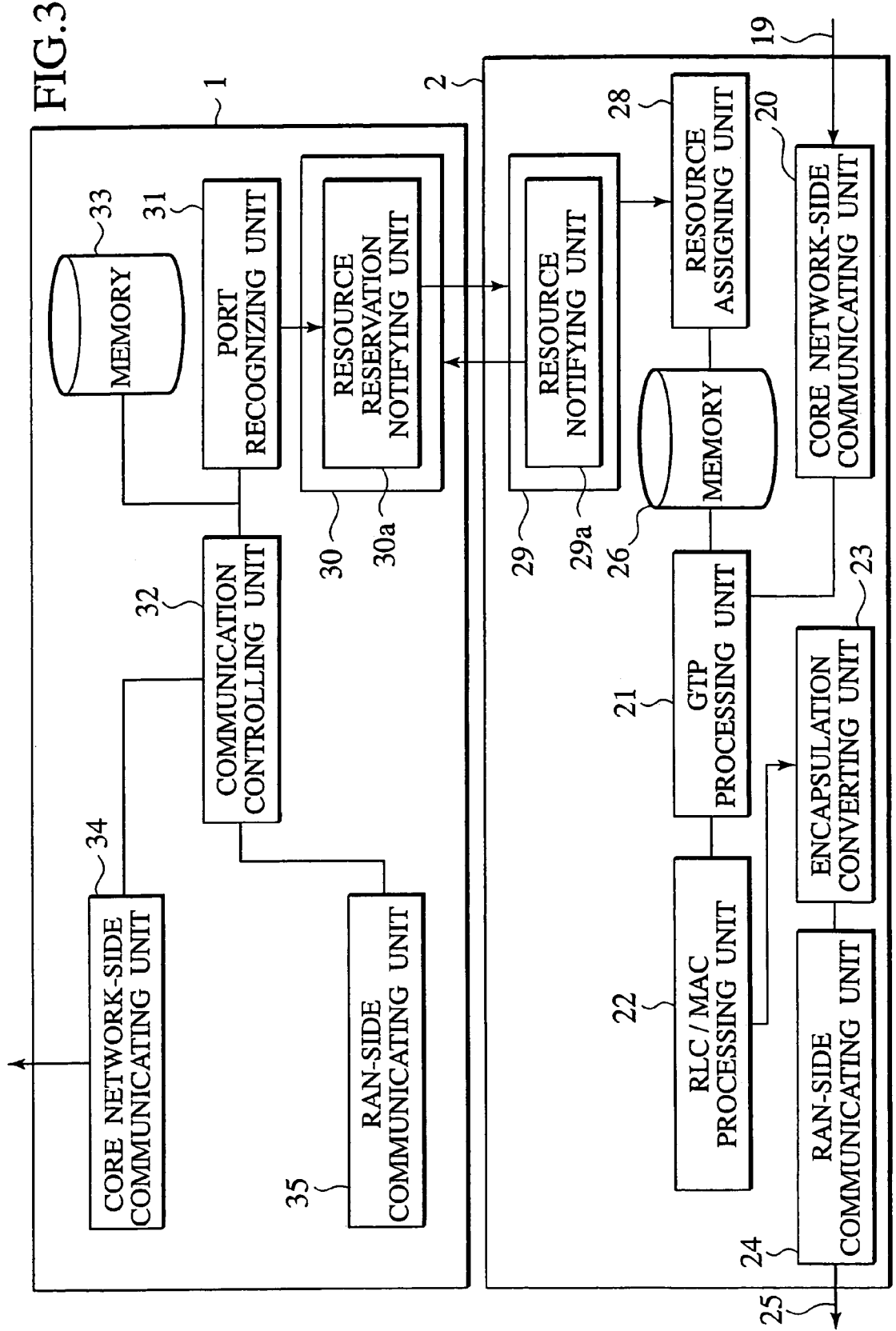
FIG. 3 is a block diagram showing internal constitutions of a control server and a data server of the embodiment.

Specifically, as shown in FIG. 3, the control server 1 is configured with the RAN-side communicating unit 35, a core-side communicating unit 34, a communication controlling unit 32, a port recognizing unit 31, an inter-server communicating unit 30 and a memory 33.

The RAN-side communicating unit 35 is connected to the base station 3 in the radio access network side through a UDP/IP port. The core-side communicating unit 34 is configured to communicate with the SGSN 4 in the core network side. The communication controlling unit 32 is configured to execute communication control such as signaling control.

The port recognizing unit 31 is configured to recognize UDP ports by referring to the memory 33. To be more specific, the port recognizing unit 31 is a module for identifying the transfer path which is a logical communication path used for transmitting and receiving IP packets.

The port recognizing unit 31 refers to the network configuration table T1 in the memory 33 to recognize a signaling UDP/IP port of the data server 2 which has data regarding the base station 3 as a target of RAB setting.

The inter-server communicating unit 30 is configured to communicate with the data servers 2 and 17. To be more specific, the inter-server communicating unit 30 is a module for carrying out IP packet transmission/reception with the data servers 2 and 17. Particularly, the inter-server communicating unit 30 includes a resource reservation notifying unit 30a configured to notify a resource reservation instruction message 8 which is an instruction to reserve a resource of a base station to the data server 2 in accordance with the configuration, when the transfer path is set.

The memory 33 is configured to store a network configuration table T1.

The network configuration table T1 stored in the memory 33 manages a configuration of the radio access network, and has a hierarchical structure to store data necessary for the signaling control during IP packet transmission/reception.

Figure 4:
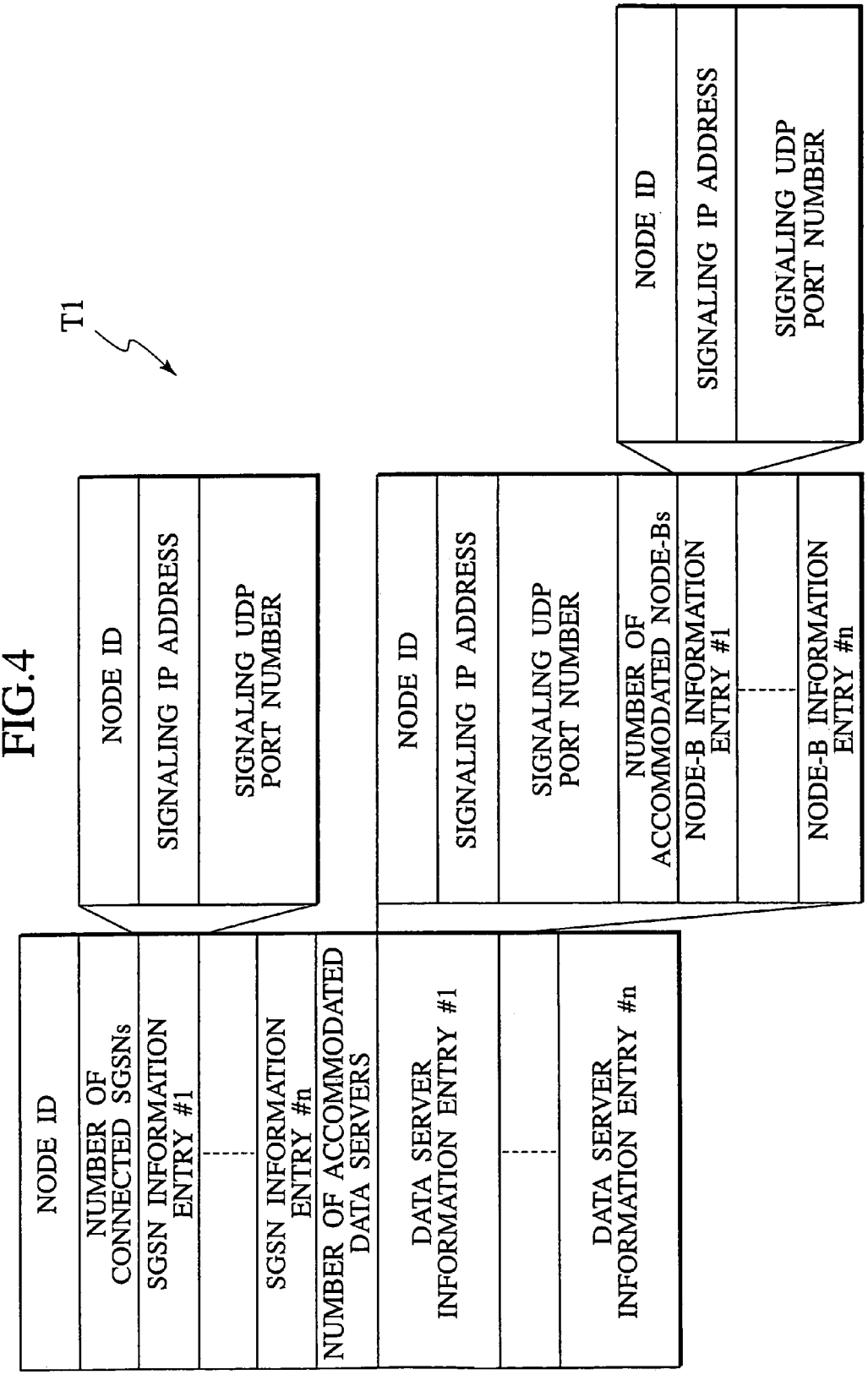
FIG. 4 is an explanatory view illustrating a data structure of a network configuration table of the embodiment.

As shown in FIG. 4, the network configuration table T1 stores the number of connected SGSNs, a plurality of SGSN information entries #1 to #n, the number of accommodated data servers, and a plurality of data server information entries #1 to #n in association with a node ID.

Each of the SGSN information entries #1 to #n includes a signaling IP address, and a signaling UDP port number in association with a node ID.

Each of the data server information entries #1 to #n includes a signaling IP address, a signaling UDP port number, the number of accommodated Node-Bs, and a plurality of Node-B information entries #1 to #n in association with a node ID.

Each of the Node-B information entries #1 to #n includes a signaling IP address, and a signaling UDP port number in association with a node ID.

Figure 5:
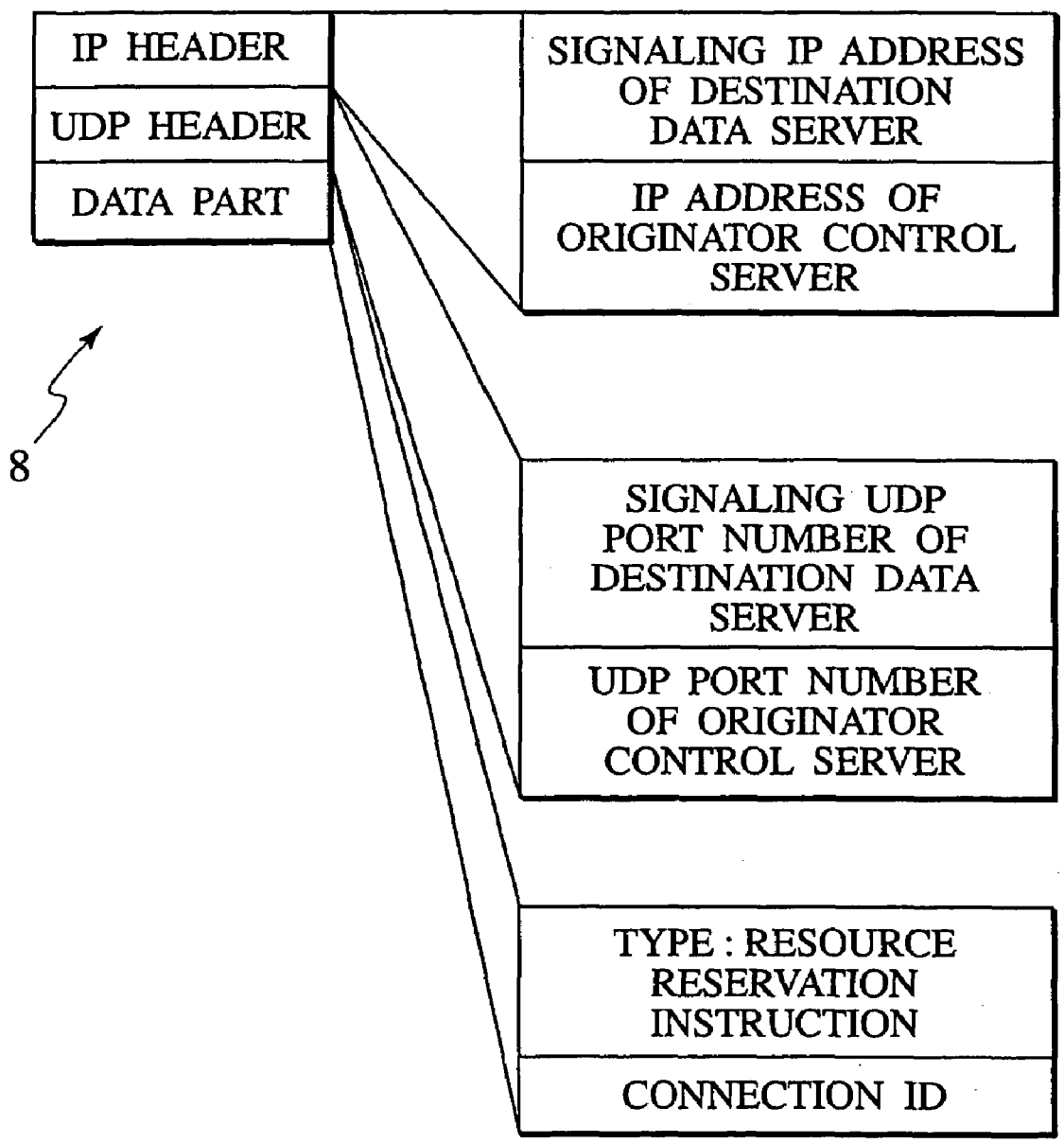
FIG. 5 is an explanatory view illustrating a data structure of a resource reservation instruction message of the embodiment.

As shown in FIG. 5, the resource reservation instruction message 8 is in a format having an IP header part, a UDP header part and a data part.

The IP header part includes a signaling IP address of a destination data server and an IP address of an originator control server.

The UDP header part includes a signaling UDP port number of a destination data server and a UDP port number of an originator control server.

The data part includes a message type indicating a resource reservation instruction and a connection ID.

The data server 2 is configured to manage a resource of a base station or a mobile station located in the radio access network. The data server 2 carries out a user data processing function of the user plane function.

Specifically, as shown in FIG. 3, the data server 2 is configured with a core-side communicating unit 20, a GTP processing unit 21, an RLC/MAC processing unit 22, an encapsulation converting unit 23, an RAN-side communicating unit 24, a memory 26, a resource assigning unit 28, an inter-server communicating unit 29.

The core-side communicating unit 20 is a module for executing IP packet transmission/reception with the SGSN 4. The core-side communicating unit 20 is connected to the SGSN 4 in the core network side through any port.

The GTP processing unit 21 is a module for executing a GTP (General Packet Radio Service Tunneling Protocol) process.

The RLC/MAC processing unit 22 is a module for executing a radio link control (RLC), medium access control (MAC) protocol process.

The encapsulation converting unit 23 is a module for converting GTP/UDP/IP header information between the data server 2 and the SGSN 4 into UDP/IP header information between the data server 2 and the base station 3.

The RAN-side communicating unit 24 is a module for executing IP packet transmission/reception with the base station 3. The RAN-side communicating unit 24 is connected to the base station 3 in the radio access network side through any port.

The memory 26 stores a resource management table T2, a connection identification table T3, a destination port information table T4, and a protocol information table T5, which are data necessary for managing resources of the base station, the mobile station or the like located in the radio access network.

Figure 6:
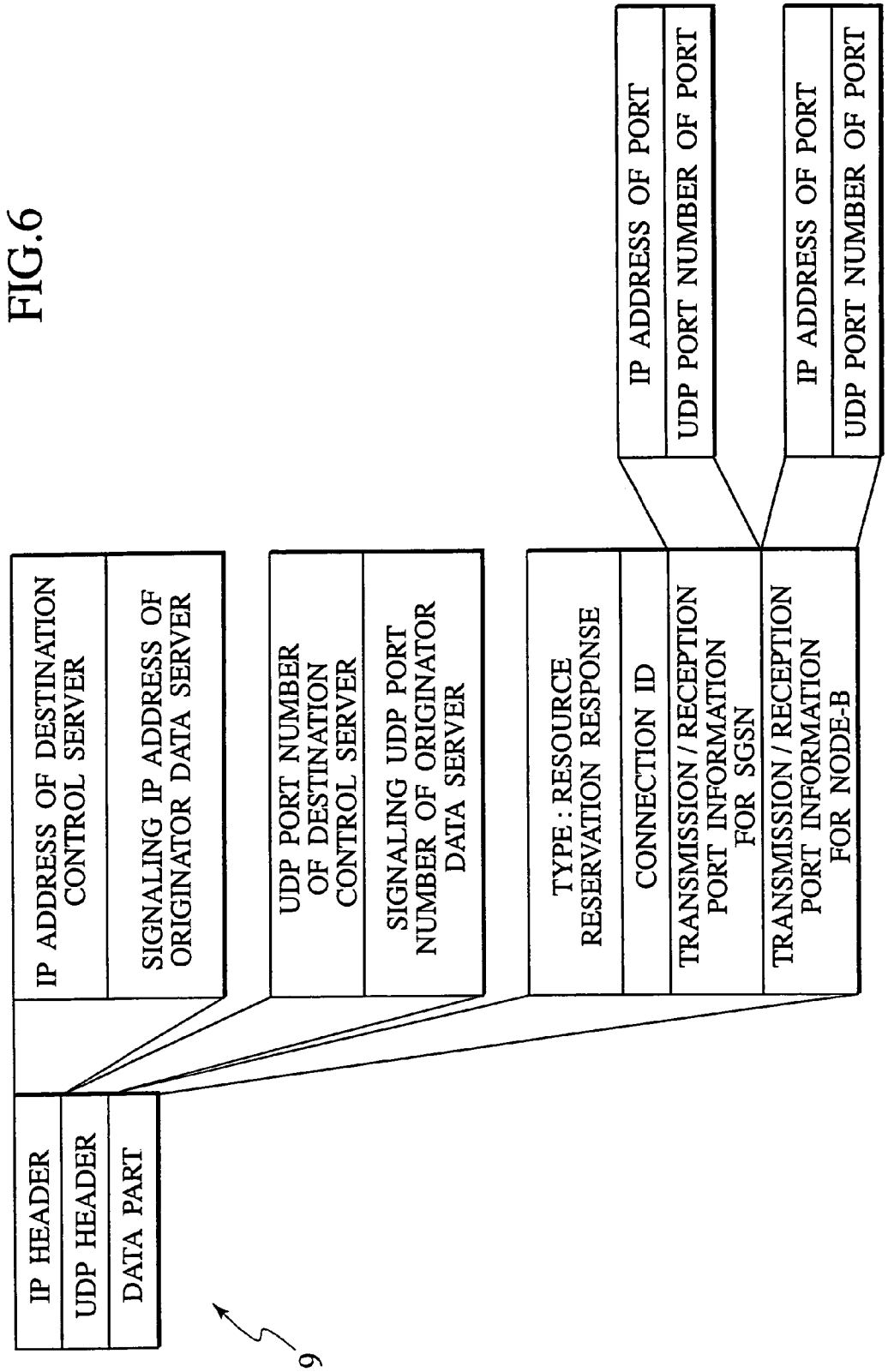
FIG. 6 is an explanatory view illustrating a data structure of a resource management table of the embodiment.

As shown in FIG. 6, the resource management table T2 is a database which has a hierarchical structure. The resource management table T2 stores the number of unused IP addresses in association with a plurality of IP address entries #1 to #n.

Each of the IP address entries #1 to #n includes a used/unused indication, an IP address and the number of unused UDP port numbers in association with a plurality of UDP port information entries #1 to #n.

Each of the UDP port information entries #1 to #n includes a used/unused indication, a UDP port number and the number of unused TEIDs (Tunnel Endpoint Identifiers) in association with a plurality of UDP port information entries #1 to #n.

Further, each of the UDP port information entries #1 to #n includes a used/unused indication in association with a TEID.

Figure 7:
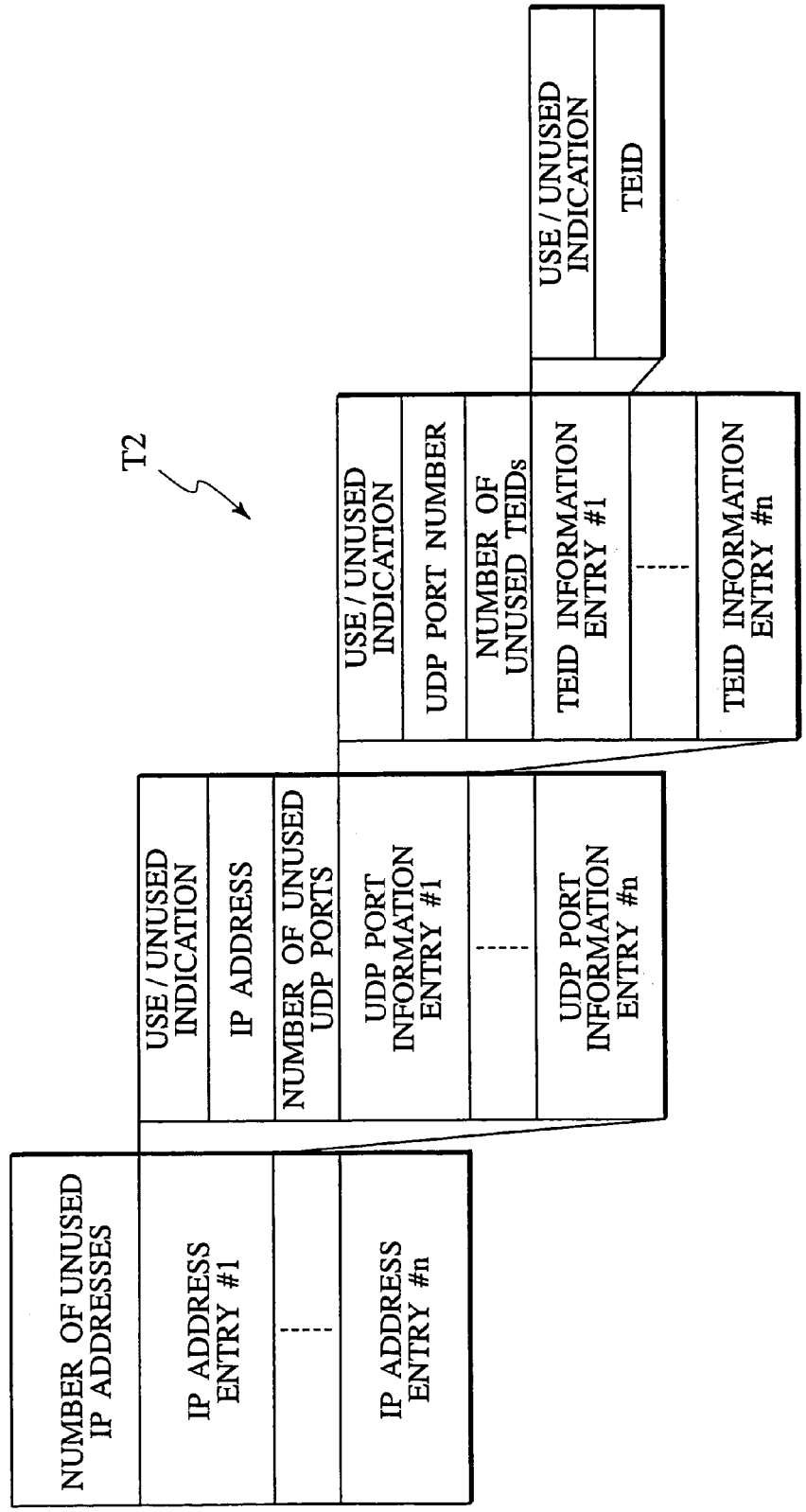
FIG. 7 is an explanatory view illustrating a data structure of a connection identification table of the embodiment.

As shown in FIG. 7, the connection identification table T3 stores a UDP port number, a TEID and a connection ID in accordance with an IP address. The TEID is inserted in a GTP/UDP/IP packet transmitted from the base station 3 and the SGSN 4.

As shown in FIG. 8, the destination port information table T4 stores Node-B-side transmission/reception port information and SGSN-side transmission/reception port information in association with a connection ID. The Node-B-side transmission/reception port information includes an IP address in association with a UDP port number. The SGSN-side transmission/reception port information includes a UDP port number and a TEID in association with an IP address.

As shown in FIG. 9, the protocol information table T5 stores GTP protocol information, RLC protocol information and MAC protocol information in association with a connection ID. The data server 1 transmits and receives IP packets between the base station 3 and the SGSN 4 using the above protocol information.

The resource assigning unit 28 is a module for assigning the managed resource to a transfer path for IP packets in accordance with a resource reservation instruction message 8 notified by a control server 1.

To be more specific, the resource assigning unit 28 refers to the resource management table T2 in accordance with the notified resource reservation instruction message 8, so as to obtain an unused UDP port number of an used IP address for the base station 3 and an unused UDP port number of an used IP address for the SGSN 4. The resource assigning unit 28 assigns an used port as a resource.

The inter-server communicating unit 29 is a module for executing IP packet transmission/reception with the control server 1. Particularly, the inter-server communicating unit 29 includes the resource notifying unit 29a configured to transmit a resource reservation response message 9 to the data server 1.

The resource notifying unit 29a notifies resources such as UDP ports assigned by the resource assigning unit 28 to the control server 1, using the resource reservation response message 9.

As shown in FIG. 10, the resource reservation response message 9 is in a format which has a UDP header part and a data part in association with an IP header part.

The IP header part includes an IP address of a destination control server in association with a signaling IP address of an originator data server.

The UDP header part includes a UDP port number of a destination control server in association with a signaling UDP port number of an originator data server.

The data part includes a connection ID, transmission/reception port information for the SGSN, and transmission/reception port information for the Node-B in association with a message type indicating a resource reservation response. The transmission/reception port information for the SGSN includes an IP address and a UDP port number of a port for the SGSN, the transmission/reception port information for the Node-B includes an IP address and a UDP port number of a port for the Node-B.

(Process during Transfer Path Setting)

Figure 11:
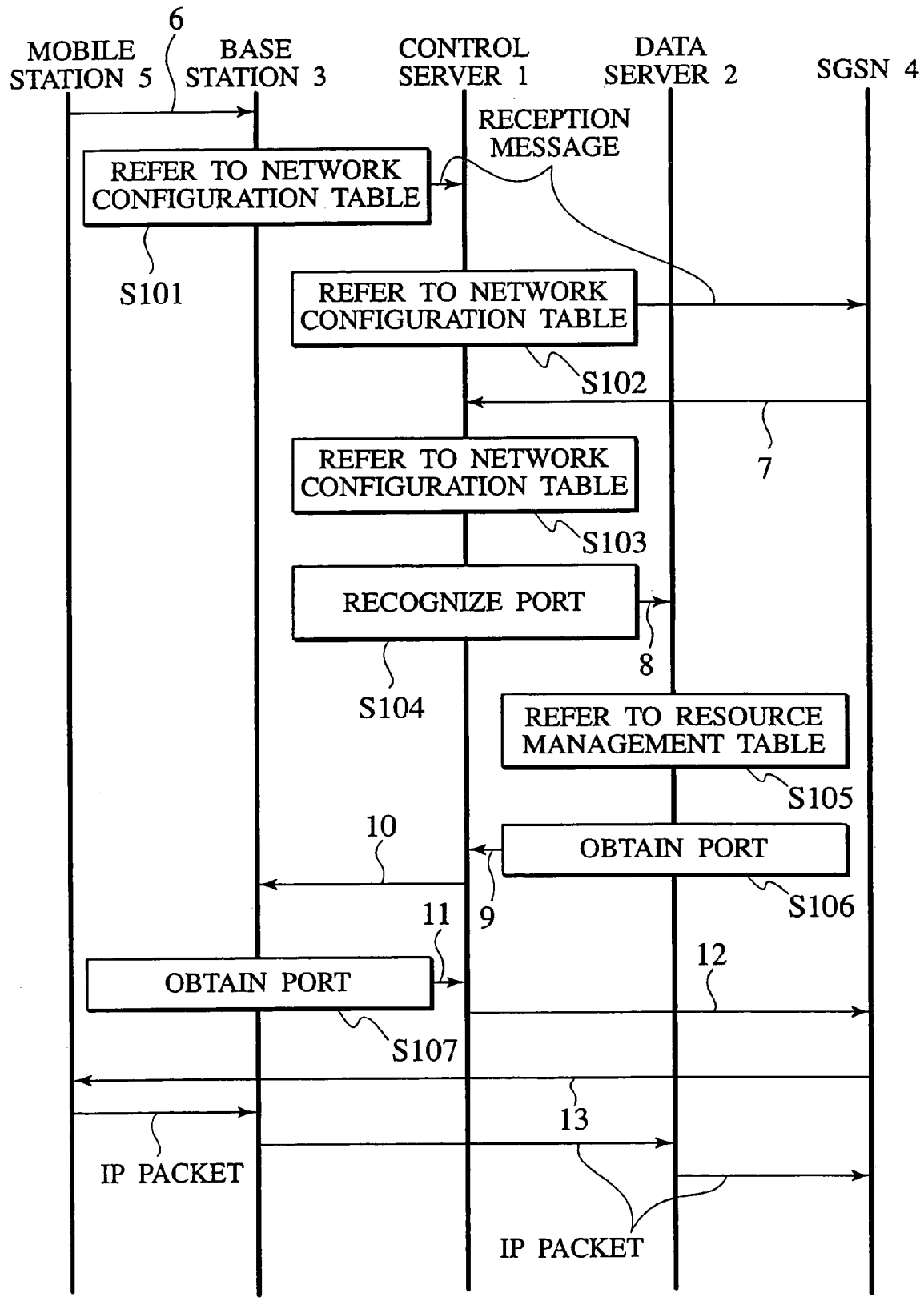
FIG. 11 is a sequential view showing a process during setting of a transfer path for an IP packet in the radio access network of the embodiment.

Referring to FIGS. 2 and 11, a process during setting of a transfer path for IP packets from the mobile station 5 to the SGSN 4 in the radio access network system of the embodiment having the foregoing configuration will be described.

The mobile station 5 transmits a message 6 which is the 3GPP-defined "Activate PDP Context Request" to the base station 3, as a transfer path setting request.

In step S101, the base station 3 refers to the network configuration table T1 stored in a nonvolatile memory in the base station 3 in accordance with the message 6 received through a signaling channel, so as to transmit the received message 6 to the RAN-side communicating unit 35 of the relevant control server 1.

In step S102, the control server 1 refers to the network configuration table T1 stored in the memory 33, so as to transmit the received message 6 through the core-side communicating unit 34 to the UDP/IP port of the SGSN 4 which manages the control server 1.

The SGSN 4 transmits a message 7 which is the 3GPP-defined "RAB Assignment Request" to the control server 1 using a UDP/IP packet, so as to set a transfer path for IP packets in the radio access network in accordance with the 3GPP specification.

In step S103, the control server 1 refers to the network configuration table T1 stored in the memory 33 in accordance with the received message 7.

In step S104, the control server 1 recognizes the signaling UDP/IP port for the data server 2 which accommodates the base station 3 as a target of RAB setting.

The control server 1 transmits a resource reservation instruction message 8 which contains a connection ID to be assigned to the transfer path decided in the control server 1, to the data server 2 using a UDP/IP packet.

In step S105, the data server 2 refers to the resource management table T2 in accordance with the received resource reservation instruction message 8.

In step S106, the data server 2 obtains an unused UDP/IP port for the base station 3 and an unused UDP/IP port for the SGSN 4.

The data server 2 transmits a resource reservation response message 9 which contains information regarding the obtained UDP/IP ports to the control server 1 using a UDP/IP packet.

The control server 1 transmits a message 10 which is the 3GPP-defined "Radio Link Setup Request" which contains the information regarding the UDP/IP port for the base station 3 obtained in the data server 2, to the base station 3.

In step S107, the base station 3 obtains an unused UDP/IP port. The base station 3 transmits a message 11 which is the 3GPP-defined "Radio Link Setup Response" which contains information regarding the obtained UDP/IP port to the control server 1 using a UDP/IP packet.

The control server 1 transmits a message 12 which is the 3GPP-defined "RAB Assignment Response" which contains the information regarding the UDP/IP port for the SGSN 4 previously obtained by the data server 2 to the SGSN 4, using a UDP/IP packet.

The SGSN 4 transmits a message 13 which is the 3GPP-defined "Activate PDP Context Response" which indicates completion of the transfer path setting, to the mobile station 5.

After the completion of the transfer path setting, IP packet transmission/reception is carried out through the mobile station 5, the base station 3, the data server 2, and the SGSN 4. IP packets are transferred through a transfer path different from a transfer path for the signaling message.

As shown in FIG. 2, when the mobile station 14 is located in a cell 14A which is under the control of the base station 15, signaling control is carried out among the SGSN 4, the control server 1, the data sever 2, the base station 15 and the mobile station 14 in accordance with the aforementioned procedure. On the other hand, IP packets are transferred through the mobile station 14, the base station 15, the data server 2, and the SGSN 4, after the completion of the transfer path setting.

When the mobile station 14 is located in a cell 16A which is under the control of the base station 18, signaling control is carried out among the SGSN 4, the control server 1, the data sever 17, the base station 18 and the mobile station 16 in accordance with the aforementioned procedure. On the other hand, IP packets are transferred through the mobile station 16, the base station 18, the data server 17, and the SGSN 4, after the completion of the transfer path setting.

(Control Process of Data Server)

Figure 12:
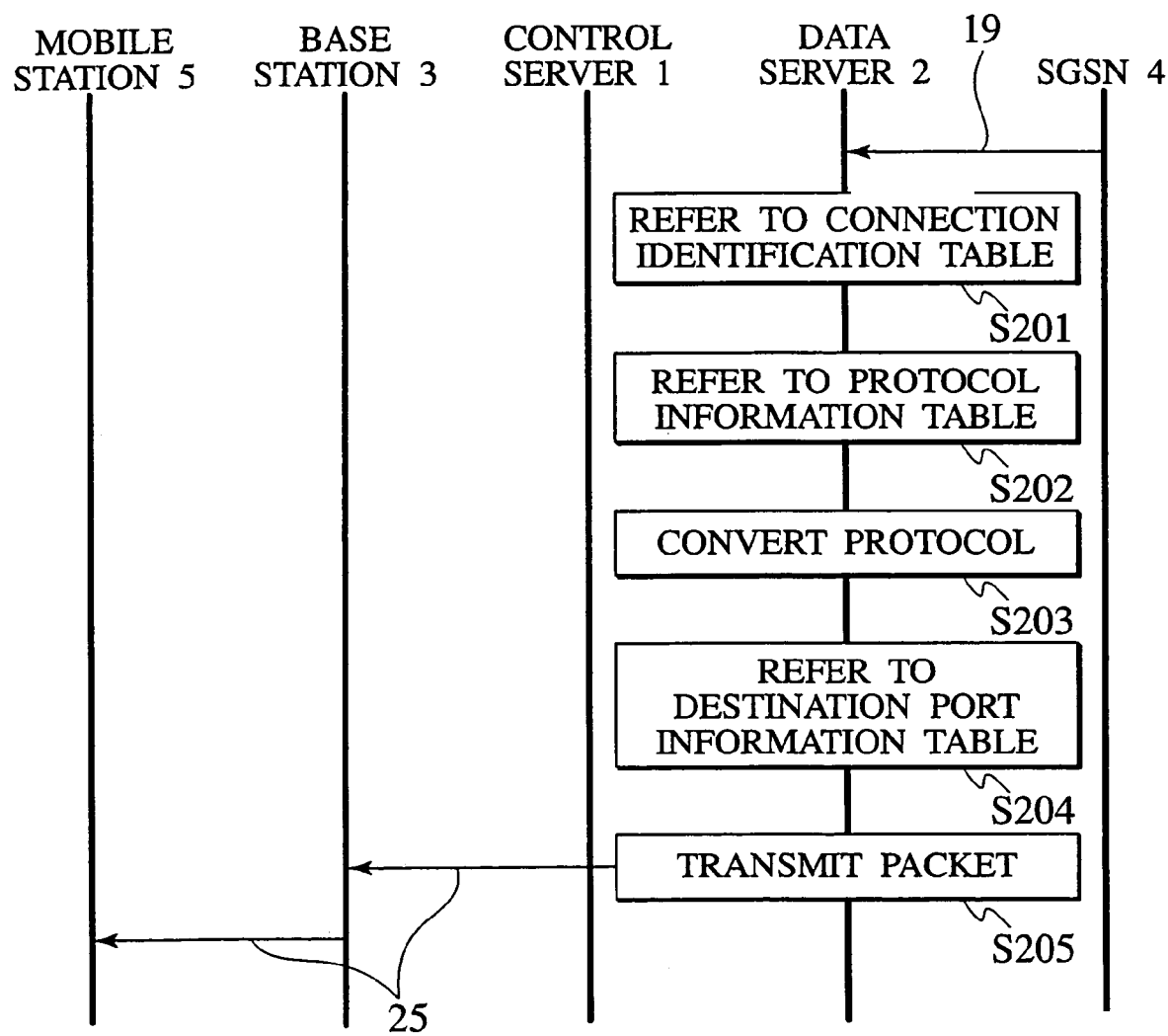
FIG. 12 is a sequential view showing a control process when an IP packet is transmitted from a core network to a mobile station in the radio access network of the embodiment.

Referring to FIGS. 2 and 12, a control process when an IP packet is transmitted from the core network to the mobile station 5 will be described.

The SGSN 4 transmits a GTP/UDP/IP packet 19 containing user data to the data server 2.

In step S201, the data server 2 refers to the connection identification table T3 in accordance with the received GTP/UDP/IP packet 19, so as to detect a connection ID associated with an IP address, a UDP port number and a TEID in the GTP/UDP/IP packet 19.

Instep S202, the GTP processing unit 21 of the data server 2 refers to the protocol information table T5 by using the detected connection ID as a key, so as to read GTP protocol information associated with the connection ID and carry out protocol process.

In step S202, the RLC/MAC processing section 22 of the data server 2 refers to the protocol information table T5 by using the detected connection ID as a key, so as to read RLC protocol information and MAC protocol information.

In step S203, the RLC/MAC processing section 22 converts the user data set in the data part of the received GTP/UDP/IP packet into an RLC and MAC protocol form.

In step S204, the encapsulation converting unit 23 refers to the destination port information table T4 by using the detected connection ID as a key, so as to obtain reception port information for the destination base station.

In step S205, the RAN-side communicating unit 24 transmits a UDP/IP packet to the base station 3. The UDP/IP packet contains the user data which has been converted into the RLC and MAC protocol form in step S203, and an IP address and a UDP port number indicating the reception port for the base station 3 obtained in step S204.

(Operation and Effect)

According to the embodiment, the radio access network system is divided into the control server for executing the control plane function and the data server for executing the user plane function, so that the processing load of the signaling function carried out at the time of setting the transfer path, and the processing load of IP packet transmission can be distributed.

According to the embodiment, transmission/reception port for transferring IP packets containing user data or the like can be assigned in the data server in accordance with a resource reservation instruction notified from the control server, so that a transfer path can be set by coordination between the control server and the data server, and a transfer path for a signaling message and a transfer path for an IP packet containing user data can be separately set.

According to the embodiment, the data server can transfer IP packets between the SGSN and the base station, through the transfer path set by the control server, e.g., the transmission/reception port for the base station and the transmission/reception port for the SGSN.

According to the embodiment, the plurality of data servers can be managed by a single control server, so that the control server can manage the transfer paths in a concentrated manner, and the load of IP packet transmission can be shared by the plurality of data servers. Moreover, addition of only a data server can be easily carried out.

According to the embodiment, the control server can determine which data server controls a specified base station, using location information and protocol information regarding the data server and the base station, when a transfer path is set on the base station.

Moreover, the data server can carry out protocol conversion such as data encapsulation conversion using information regarding the protocol information, when IP packets are transferred.

As described above, according to the radio access network system, the radio communication method, the control server and the data server of the present invention, it is possible to distribute loads and functions in the radio access network by dividing functions of the conventional control apparatus into the control server for executing the control plane function and the data server for executing the user plane function. When additions and changes are made in the radio access network, only the necessary functions need to be added, and thus a cost incurred by the additions and the changes can be reduced.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio access network system comprising:
a control server, comprising
a manager configured to manage a configuration of a radio access network including a data server and a base station managed by the data server, wherein the base station and the data server are connected to the control server;
a transfer path setter configured to set a data transfer path for an IP packet containing user data in accordance with the configuration;
an inter-server communicator configured to notify an instruction to reserve a resource of the data server for the base station in accordance with the configuration, wherein a connection ID is assigned to the data transfer path and included in the instruction when the data transfer path is set; and
a radio access network-side communicator configured to transmit the resource to the base station,
the data server, comprising:
a manager configured to manage a resource of a base station located in the radio access network;
a resource assigner configured to assign the resource to the data transfer path for an IP packet containing user data in accordance with the resource reservation instruction notified by the control server; and
a resource notifier configured to notify the resource assigned by the resource assigner to the control server.

2. A radio communication method in a radio access network, the method comprising the steps of:
managing, in a control server, a configuration of the radio access network, said radio access network including a data server and a base station managed by the data server, wherein the base station and the data server are connected to the control server;
setting a data transfer path for an IP packet containing user data in accordance with the configuration, in the control server;
notifying an instruction to reserve a resource of the data server for the base station in accordance with the configuration, wherein a connection ID is assigned to the data transfer path and included in the instruction when the data transfer path is set, in the control server;
managing a resource of a base station located in the transfer path set by the control server, in the data server;
assigning the resource to the data transfer path for an IP packet containing user data in accordance with a resource reservation instruction notified by the control server, wherein the resource reservation instruction comprises a connection ID assigned to the data transfer path, in the data server;
notifying the resource assigned to the control server, in the data server; and
transmitting the resource to the base station, in the control server.

3. A control server comprising:
a manager configured to manage a configuration of a radio access network including a data server and a base station managed by the data server;
wherein the base station and the data server are connected to the control server;
a transfer path setter configured to set a data transfer path for an IP packet containing user data in accordance with the configuration;
an inter-server communicator configured to notify an instruction to reserve a resource of the data server for the base station in accordance with the configuration, wherein a connection ID is assigned to the data transfer path and included in the instruction when the data transfer path is set, and to receive the resource assigned by the control server, and
a radio access network-side communicator configured to transmit the resource to the base station.

4. The control server according to claim 3, wherein the control server is connected to a plurality of data servers.

5. A data server comprising:
a manager configured to manage a resource of a base station located in a radio access network;
a resource assigner configured to assign the resource to a data transfer path for an IP packet containing user data in accordance with a resource reservation instruction notified by a control server, wherein the resource reservation instruction includes a connection ID assigned to the data transfer path; and
a resource notifier configured to notify the resource assigned by the resource assigner to the control server.

6. The data server according to claim 5, wherein the data server transmits and receives the IP packet containing the user data via the data transfer path set by the control server.

* * * * *